Sept. 3, 1963   H. R. NILSSON   3,102,681
IMPROVEMENTS IN HOUSING CONSTRUCTIONS FOR
ROTARY PISTON ENGINES
Filed June 17, 1960   5 Sheets-Sheet 1

Sept. 3, 1963  H. R. NILSSON  3,102,681
IMPROVEMENTS IN HOUSING CONSTRUCTIONS FOR
ROTARY PISTON ENGINES
Filed June 17, 1960  5 Sheets-Sheet 2

INVENTOR.
Hans Robert Nilsson
BY
Lawson and Taylor

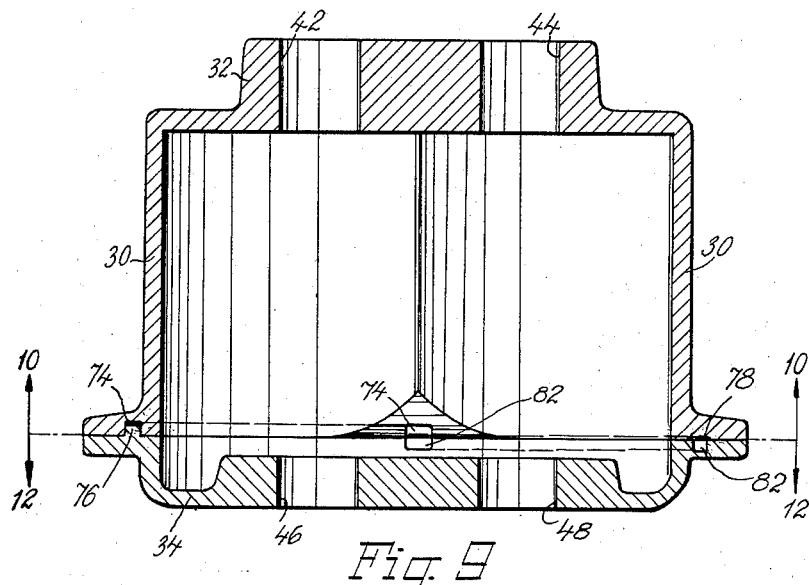
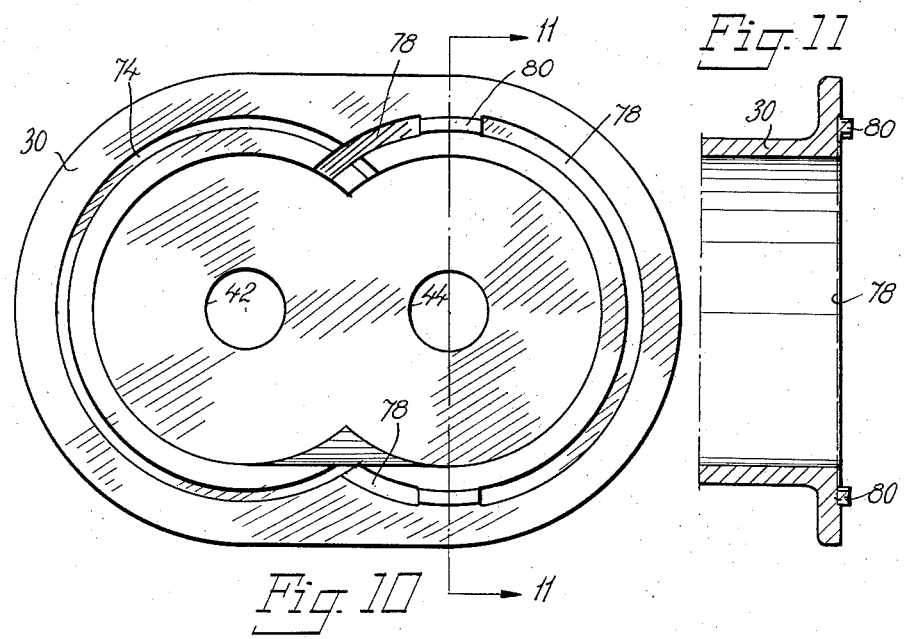

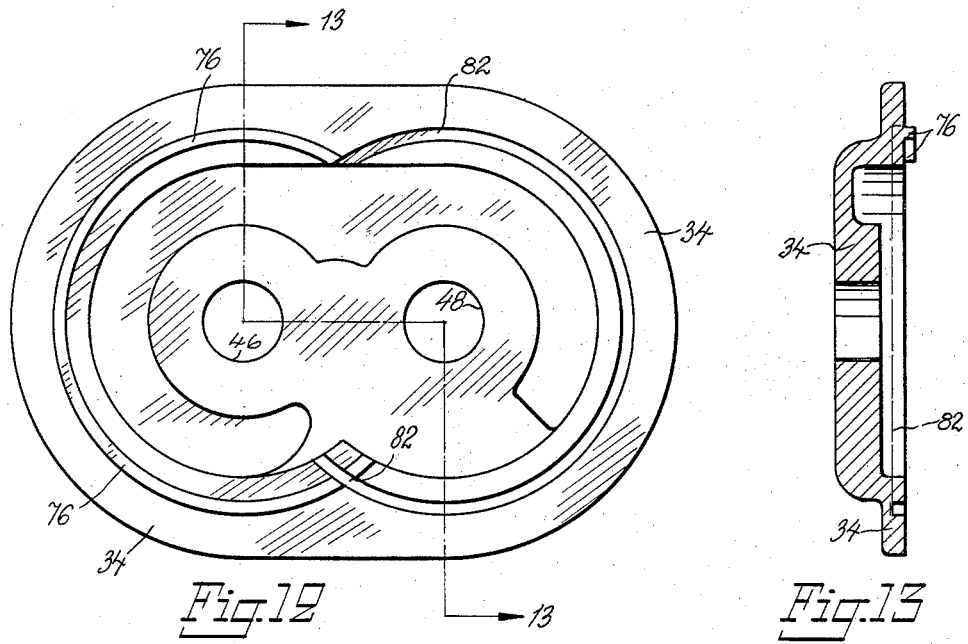
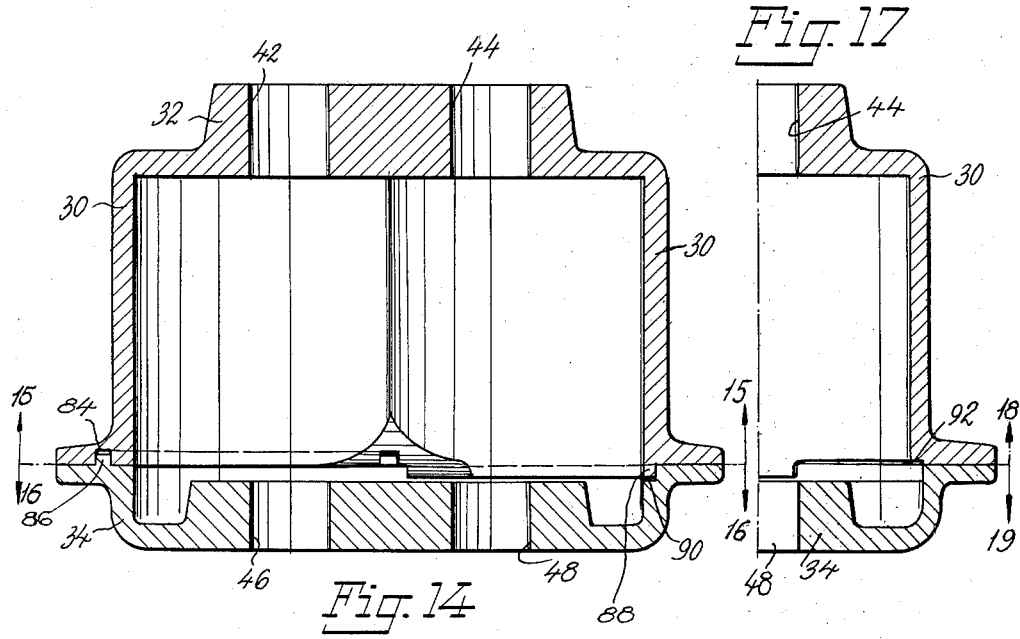

Sept. 3, 1963 H. R. NILSSON 3,102,681
IMPROVEMENTS IN HOUSING CONSTRUCTIONS FOR
ROTARY PISTON ENGINES
Filed June 17, 1960 5 Sheets-Sheet 5

Hans Robert Nilsson INVENTOR.
BY
Larson and Taylor

United States Patent Office 3,102,681
Patented Sept. 3, 1963

3,102,681
IMPROVEMENTS IN HOUSING CONSTRUCTIONS
FOR ROTARY PISTON ENGINES
Hans Robert Nilsson, Ektorp, Sweden, assignor to Svenska Rotor Maskiner Aktiebolag, Nacka, Sweden, a corporation of Sweden
Filed June 17, 1960, Ser. No. 36,762
Claims priority, application Sweden June 17, 1959
10 Claims. (Cl. 230—143)

The present invention relates to rotary piston engines such as elastic fluid compressors or expanders and has for its primary object the provision of improved housing construction for enclosing the intermeshing screw or other form of rotors characteristic of such engines.

A basically necessary component for such engines is a housing structure embodying a barrel portion providing at least two intersecting bores therein for the reception of the rotary pistons and end wall or equivalent end structure providing the necessary support for the bearings by means of which the pistons are rotatably supported. In order for the pistons to be inserted in or removed from the bores, the housing must obviously be made of separable parts and ordinarily the desired objective is accomplished by making either one or both of the end wall structures separable from the barrel portion of the housing or by transversely parting the barrel portion at some point along its length to provide two separable barrel parts each of which may have integral with it one of the bearing supporting end structures.

In all engines of the kind under consideration the efficiency of operation is largely dependent upon the closeness of the clearances between the pistons and the housing and this in turn is dependent upon not only the accuracy with which the pistons and the housing bores are made, but also upon the accuracy with which the bearing means for supporting the pistons are centered and aligned with respect to the respective bores with which the pistons cooperate. To obtain such accuracy, various expedients have heretofore been employed in the formation and assembly of the housing parts. Such prior constructions have, however, proved to be less than entirely satisfactory either from the standpoint of difficulty of insuring the desired accuracy, expense of manufacture and assembly or other reasons, and it is therefore the general object of the present invention to provide an improved form of housing structure which will eliminate the deficiencies of prior structures while at the same time being simple, and readily manufacturable at low cost, easily assembled, and readily disassembled and reassembled without loss of accuracy of the centering and alignment of the component parts carried by the structure.

The manner in which the above general object and other and more detailed objects hereinafter appearing are attained may best be understood from a consideration of the several examples of structure embodying the invention, hereinafter described following a brief résumé of typical examples of prior art constructions upon which the present invention improves.

In the drawing, forming a part hereof:

FIGS. 1 to 6 inclusive illustrate prior forms of construction, FIGS. 1, 3 and 5 being longitudinal central sections, respectively, of their different embodiments and FIGS. 2, 4 and 6 being transverse sections taken on the respectively unnumbered section lines appearing in FIGS. 1, 3 and 5.

FIG. 9 shows another embodiment in longitudinal section.

FIG. 10 shows a cross section on the line 10—10 of FIG. 9.

FIG. 11 shows a vertical section on the line 11—11 of FIG. 10.

FIG. 12 shows a cross section on the line 12—12 of FIG. 9.

FIG. 13 shows a vertical section on the line 13—13 of FIG. 12.

FIG. 14 shows another embodiment in longitudinal section.

FIG. 17 shows a partial longitudinal section of a modified embodiment of the example shown in FIGS. 14—16.

Figure 1:
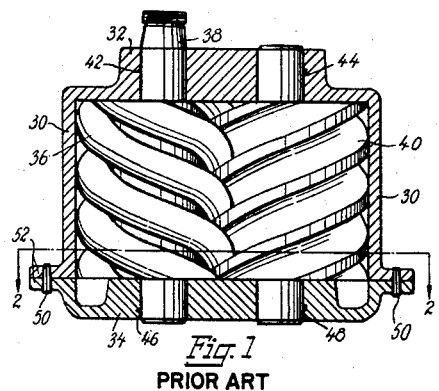
Figure 2:
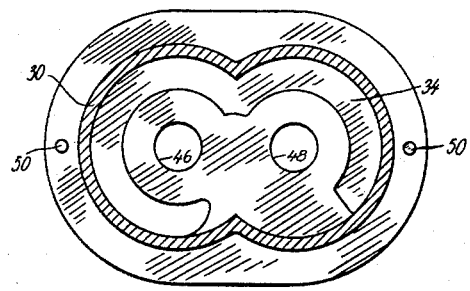

Referring now to the drawings, FIGS. 1 and 2 show a prior form of constructions in which the housing structure is formed by a barrel portion 30 which is integral with one end wall 32, the other end wall 34 being separate. The male and female rotors 36 and 40 are carried by bearings 42, 44 and 46, 48 located in the end walls of the structure. In this construction, in order to insure accuracy of centering and alignment of the rotors, the separate end wall 32 must be located with respect to the other part of the housing with extreme accuracy and held in such position while the bores for the pilot or locating pins 50 are formed and the pins installed, this being not only a delicate and time consuming operation but further necessitating relatively expensive jigs and fixtures if dependable results are to be obtained.

Figure 4:
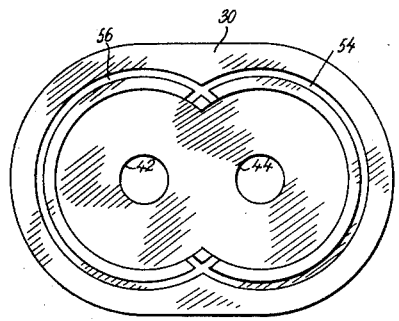
Figure 3:
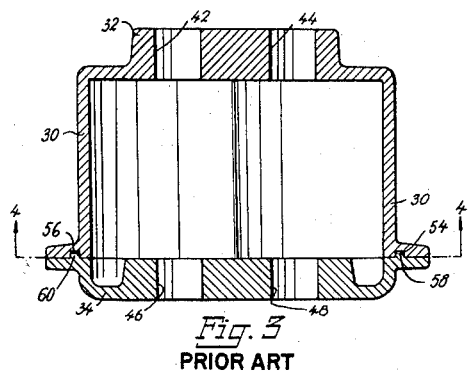

In the prior form of housing shown in FIGS. 3 and 4, which also has one wall separate from and one end wall integral with the barrel portion, alignment is secured by providing the partition end surface of the barrel portion 30 with grooves 54 and 56, concentric respectively with the intersecting bores which receive the rotors. Mating circular projections 58 and 60 are formed on the partition face of the end wall 34, concentric respectively with the bearing bores 48 and 46. It is evident that in such construction, the manufacturing tolerances inherently required for the formation of this multiple groove and projection construction leads to difficult and expensive manufacturing procedures if acceptable accuracy of alignment and centering is to be reliably insured.

Figure 5:
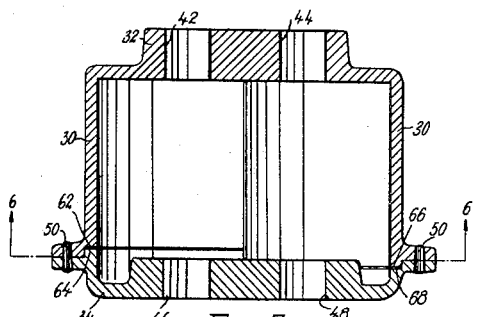
Figure 6:
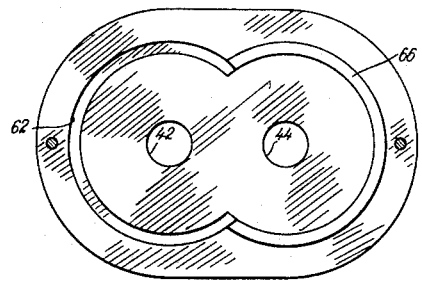

A third prior form of construction is shown in FIGS. 5 and 6 which is similar to that shown in FIGS. 3 and 4, but differs therefrom in that while the partition end face of the barrel portion is provided with a groove 62 concentric with one bore, with which an arcuate projection 64 on the separate end wall 34 mates, an arcuate projection 66 is provided concentric with the other bore, which projection mates with groove 68 in the partition face of end wall 34, concentric with said other bore. This construction presents the same deficiencies as noted above in connection with the modification shown in FIGS. 3 and 4, plus the added deficiency of affording even poorer alignment if subjected to heat distortion due to temperature differentials usually present in the normal operation of such engine.

In accordance with the present invention, constructions such as those just described are simplified and their deficiencies largely eliminated by a novel form of construction in which a first pilot means is provided, which is formed by a circular groove in a partition face of one housing part which is concentric with one of the bores and which mates with a corresponding circular projection on the partition face of the cooperating part of the housing.

The first pilot means provides a quick, cheap and easy way for centering the parts rotationally with respect to each other and the center of one of the housing bores, since a main bore, a bearing bore and circular pilot groove or projections can all readily be turned with a single setting of the housing piece. Such first pilot means is complemented by a second pilot means operative to fix the relatively rotatable parts which are concentric with respect to the axis of one bore in such relative angular positions that the bearing means and the axis of the second bore are in proper alignment. Structures embodying the principles above outlined may be made in different specific ways within the scope of the invention, as will appear from the following portion of this specification descriptive of suitable examples of apparatus for carrying the invention into effect.

Figure 7:
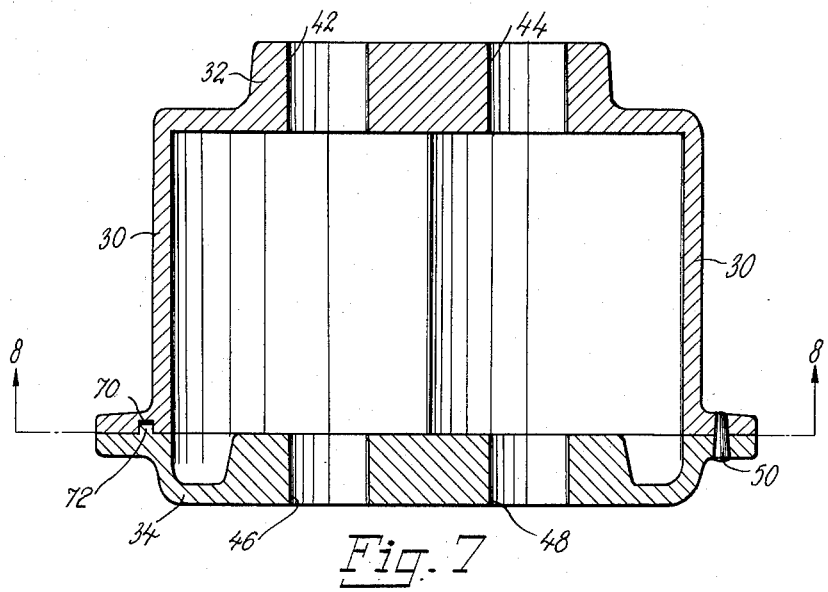
FIG. 7 shows a central longitudinal section of one form of housing structure embodying the invention.
Figure 8:
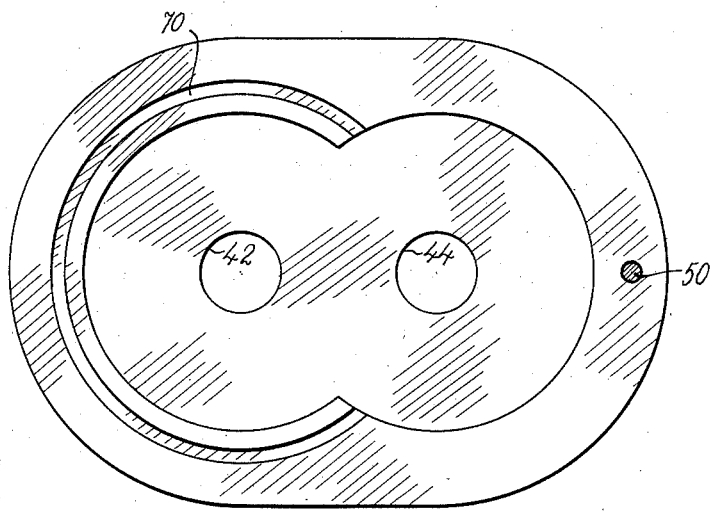
FIG. 8 shows a section taken on line 8—8 of FIG. 7.

Referring now more particularly to the embodiment shown in FIGS. 7 and 8, the integral housing section 30, 32 is provided with a groove 70 recessed into the partition face of the section and is concentric with the center of the bore of the male rotor. The separate end wall 34 is provided with a corresponding projection 72 on the partition face of this end wall and the projection and the groove cooperate along both the peripheral side faces of the projection. The end wall 34 in accordance therewith is fixed in relation to the bore of the male rotor and turnable around the center thereof. If the end wall 34 is turned, the center of the female bore will coincide with the center of the corresponding bore 48 for the bearing in the end wall. This position can easily be determined by a simple tool, whereafter the end wall is fixed by means of a conical or cylindrical pin 50 positioned at the opposite end of the partition face of the housing, viz. opposite the first mentioned pilot means. It is self-explanatory that the respective guide means may change their places, that is to say so that the groove 70 and the projection 72 will be lying on the female rotor side and the pilot pin 50 on the male rotor side.

In the embodiment of the housing shown in FIGS. 9–13 the integral housing section 30, 32 and the end wall 34 of the male rotor side are provided with similar groove 74 and projection 76, respectively, as at the embodiment just described. On the female rotor side the pilot means consists of two short arcuate projections 80 provided on the integral housing section 30, 32 concentrically around the bore of the female rotor. Said projections are located at radii which conveniently are perpendicular to the connection line between the axis of the male and female rotor bores. In order to simplify the finishing of said projections 80 the partition face of the integral housing section is provided with a groove 78 of a small depth. Said groove is concentric with the axis of the bore of the female rotor and extends on either side of the pilot projections. The separate end wall 34 in its turn is provided with a groove 82 concentric with the axis of the bore of the female rotor. The projections 80 and the corresponding groove 82 are provided to cooperate along both the peripheral side faces of the respective projections. The manufacture of the pilot means for this second rotor bore and bearing bore, respectively, concentrically with the center of the bore of the female rotor and its corresponding center of the bearing can be easily performed on a lathe according to what is stated above. Since the end wall 34 is aligned with the one rotor bore, that is to say the male rotor bore in this case, and is turnable around said center, it is sufficient with a single peripherally short projecting pilot projection for the other bore, that is to say the female rotor bore, so located that the projection aligns the position of adjustment of the end wall in relation to the center of the first rotor bore. In this case the tolerance as regards the center distance is of less account, since the short pilot means permits movement along a line through the centers of both the rotor bores. From point of view of manufacture, advantageously the pilot means are formed so that in one and the same section the one pilot means comprises a groove and the other pilot means a pilot projection. However, it is also conceivable according to the invention to locate the grooves only in one of the housing sections and the pilot projections in the other. It is also conceivable to utilize a single pilot projection instead of the two short pilot projections 80.

Figure 15:
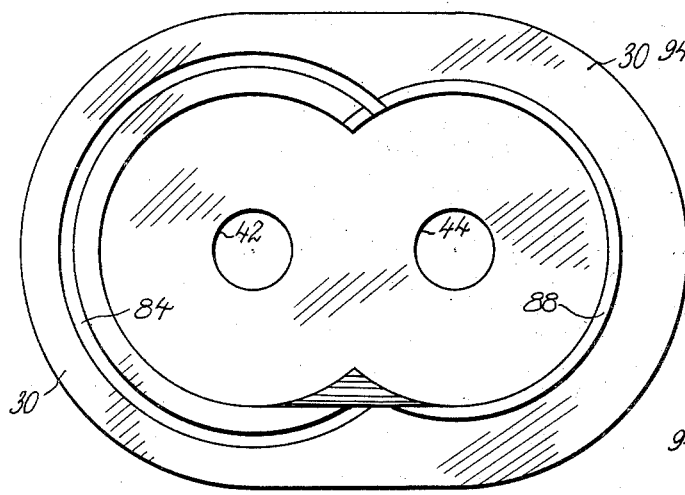
FIG. 15 shows a cross section on the line 15—15 of FIG. 14.
Figure 18:
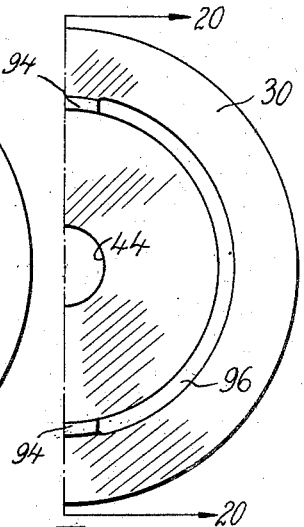
FIG. 18 shows a partial cross-section on the line 18—18 of FIG. 17.
Figure 16:
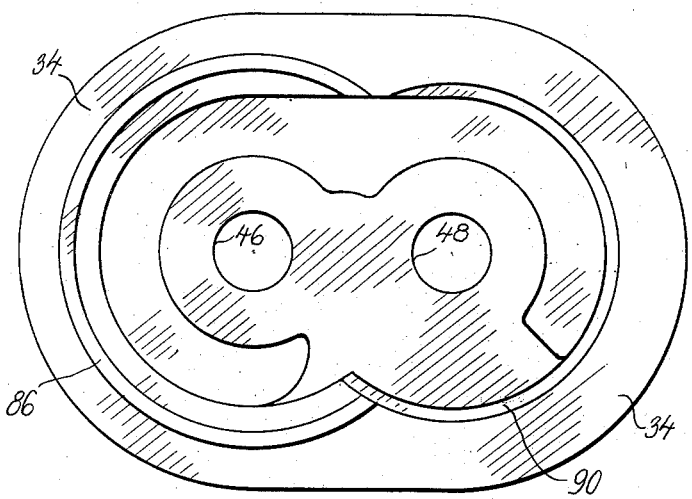
FIG. 16 shows a cross section on the line 16—16 of FIG. 14.
Figure 19:
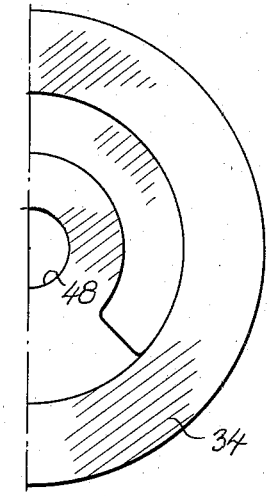
FIG. 19 shows a partial cross-section on the line 19—19 of FIG. 17.
Figure 20:
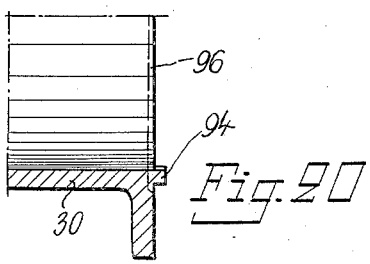
FIG. 20 shows a partial vertical section on the line 20—20 of FIG. 18.

In the housing embodiment according to FIGS. 14–16 the pilot means on the male rotor side comprise groove 84 and projection 86, respectively, similar to those in the previous examples of construction and located in the housing section 30, 32 and in the end wall 34. The pilot means on the female rotor side includes at least an arcuate projection 88 located on the integral housing section 30, 32 which projection forms an axial prolongation of the cylindrical barrel for the bore of the female rotor. A corresponding recess 90 is provided in the end wall 33 in such a manner that the projection and the recess are cooperating along the radially external periphery of the projection. As regards the embodiment of FIGS. 14–16 mainly the same can in the main be stated as is said in connection with FIGS. 9–13. In the present example of FIGS. 14–16, the projecting pilot 88 can as is visible therefrom have a longer peripheral extent so that it runs along the complete circumference of the barrel of the bore of the female rotor, since said pilot only guides in one direction along a line through the centers of both the female bores.

FIGS. 17–20 show in the modification of the embodiment of FIGS. 14–16 that instead of the relatively long projection 88 on the female rotor side, two short pilots 94 are substituted which pilot means may be located along a line perpendicularly to the connection line between the centers of the rotor bores. In the same manner as in the housing of FIGS. 9 and 10, a shallow groove 96 is recessed along the remaining portion of the partition face of the integral housing section 30, 34.

In the embodiments of FIGS. 9–20 the advantageous embodiment is shown which consists in locating the separate end wall on the low pressure end for the reason that the pressure at this end is practically equal peripherally all along the length of the pilot means so that clearance, if any, in such means does not cause any appreciable leakage. While for purposes of illustration several suitable examples of apparatus have been shown and described, it will be understood that the invention is not limited to such examples but embraces all structures falling within the scope of the appended claims.

I claim:

1. A housing structure for a rotary piston engine, said structure comprising an integral first section providing a barrel portion having parallel intersecting bores therein and a first end wall portion at one end of said bores and a second section separable from said first section providing a second end wall portion at the opposite end of said bores, said end wall portions being provided with bearing support means for mounting rotary pistons to rotate about axes concentric with the axes of the respective bores in which the pistons are located, and locating means for fixing the positions of said sections relative to each other with the axis of the bearing means for each rotor coaxial with the axis of the cooperating bore comprising a first pilot means providing an annular groove in a partition end surface of one of said sections concentric with and larger than one of said bores and a mating projection in a cooperating partition end surface of the other section concentric with the axis of the bearing means in said one of said sections, whereby said sections may be turned relative to one another with the axes of one pair of bearing means at the opposite ends of one of said bores coaxial with the axis of the bore and a second pilot means for fixing the angular position of said sections relative to each other with the axes of the remaining pair of bearing means coaxial with the axis of the remaining bore.

2. A housing structure as defined in claim 1, in which the second pilot means includes a pilot opening in each of said sections, said pilot openings being located in portions of said section remote from said one of said bores, and a pilot pin engaging both of said openings.

3. A housing structure as defined in claim 2, in which said openings are tapered and extend generally axially of said sections and said pilot pin is in the form of a taper pin.

4. A housing structure as defined in claim 1, in which said second pilot means includes a short arcuate projection on the partition surface of said second housing section concentric with said remaining bore and a correponding groove in the partition surface of said first section, the last mentioned projection and corresponding groove being shaped to provide engagement along both peripherally extending side faces of the projection and of the groove.

5. A housing structure as defined in claim 4, in which said second pilot means comprises two short arcuate projections on the partition surface of said second section cencentric with said remaining bore and located on the radii substantially perpendicular to the plane of the axes of said bores, and a corresponding groove in the partition surface of said first section, said projection and groove being shaped to provide engagement along both peripherally extending side faces of the projection and of the groove.

6. A housing structure as defined in claim 1, in which said second pilot means includes an arcuate projection on the partition surface of said second section, said projection having a radially inner side face of the same radius and coaxial with said remaining bore of said first section and a corresponding recess in the barrel portion of said first section, the last mentioned projection and recess being shaped to provide along the outer peripheral side faces of both the projection and the recess.

7. A housing structure as defined in claim 6, in which said recess extends around the entire circumference of said remaining bore.

8. A housing structure as defined in claim 6, in which said second pilot means comprises two short arcuate projections in said second section located on the radii substantially perpendicular to the plane of the axes of said rotors and a corresponding recess in said first section.

9. A housing structure as defined in claim 8, in which the recess of said first section extends along the entire periphery of the remaining bore of said first section.

10. A housing structure as defined in claim 1, in which said partition surfaces are located at the low pressure end of said bores.

References Cited in the file of this patent
UNITED STATES PATENTS

| | | |
|---|---|---|
| 1,459,552 | Rathman | June 19, 1923 |
| 2,124,140 | Foster et al. | July 19, 1938 |
| 2,362,106 | Ungar et al. | Nov. 7, 1944 |
| 2,447,744 | Duemler | Aug. 24, 1948 |
| 2,714,857 | Albright et al. | Aug. 9, 1955 |
| 2,900,920 | Compton | Aug. 25, 1959 |
| 2,915,017 | Whitney | Dec. 1, 1959 |
| 2,955,537 | Gaubatz | Oct. 11, 1960 |